United States Patent Office 2,816,021
Patented Dec. 10, 1957

2,816,021

METHOD OF PRODUCING TITANIUM

James Paterson Quin, Widnes, England, assignor to Imperial Chemical Industries Limited, London, England, a corporation of Great Britain No Drawing. Application July 16, 1956,
Serial No. 597,873

Claims priority, application Great Britain August 11, 1955

7 Claims. (Cl. 75—84.5)

This invention relates to the manufacture of metals and more particularly to improvements in the manufacture of metallic titanium.

One method for the manufacture of metallic titanium comprises the reaction of sodium with titanium tetrachloride preferably at a temperature between 800° and 900° C. and in the presence of an atmosphere inert to the reactants and reaction products. After reaction is complete the resulting mixture of titanium and sodium chloride is cooled in an inert atmosphere and then ground to a powder before leaching in an aqueous solution to dissolve out the sodium chloride. The titanium so isolated is in the form of a powder which requires conversion to a ductile titanium and this is effected by arc melting preferably in an arc furnace in the presence of an inert gas.

It has been found, however, that titanium powder obtained by the general method aforedescribed contains an appreciable quantity of hydrogen and the presence of this has a deleterious effect on the melted titanium product in causing embrittlement.

Another difficulty caused by the presence of hydrogen in the titanium is in the process of arc melting the titanium powder. The evolution of hydrogen gas during the melting operation tends to have an adverse effect on the stability of the electric arc and a particular difficulty is caused by the evolved hydrogen blowing about the fine particles of powder and upsetting the equilibrium conditions of working. One method which has found practical application in coping with these problems has been to remove the hydrogen before arc melting by subjecting the powder to a prior degassing treatment but this is a time-consuming and costly operation not commendable on a commercial scale.

In co-pending U. S. application Serial No. 594,690, filed June 29, 1956, it is stated that titanium metal of low hydrogen content can be obtained by so conducting the reaction between titanium tetrachloride and sodium that sub-chlorides of titanium are present in the reaction product and then leaching the crushed reaction product in an aqueous medium containing a mineral acid and a soluble formate or oxalate, conveniently an alkali metal formate or oxalate.

The presence in the reaction product of sub-chlorides of titanium can be readily assured by using in the reaction a slight excess of titanium tetrachloride over the stoichiometric proportion, for example, an excess of about 1% by weight.

We have now found that titanium metal of low hydrogen content can similarly be obtained by leaching the aforementioned reaction product in an aqueous medium containing a mineral acid together with a soluble phosphite, conveniently an alkali metal phosphite.

In a process for the manufacture of titanium by the reaction of titanium tetrachloride with metallic sodium in an inert atmosphere and isolating titanium from the products by leaching in an aqueous solution the present invention comprises the improvement whereby titanium of low hydrogen content is obtained which includes carrying out the said reaction in the presence of lower chlorides of titanium and then leaching the products with an aqueous solution of a mineral acid containing a soluble phosphite. Advantageously the soluble phosphite is sodium phosphite.

The presence in the reaction product of subhalides of titanium can readily be assured by using in the reaction a slight excess of titanium tetrachloride; advantageously we use more than 0.25% by weight over the stoichiometric quantity but we prefer to employ an excess of between 0.5% and 3.0% by weight.

A suitable method of carrying out the invention is to react molten sodium with a slight excess of titanium tetrachloride at about 850° in an atmosphere of argon. When the reaction is complete the products are cooled in the same inert atmosphere and then crushed and ground to powder. Alternatively other methods of comminution may be employed, for example, the products may be subjected to size reduction by machining into chips. The powdered material is then leached with a weak solution of hydrochloric acid containing a small quantity of sodium phosphite or potassium phosphite, for instance, a solution containing 2% of hydrogen chloride and 1% of sodium phosphite. Advantageously the acidified solution should contain less than 10% by weight of sodium phosphite but we prefer a sodium phosphite concentration of between 0.5% and 2.0% by weight. After stirring for 30 minutes at ordinary temperature the aqueous solution containing dissolved sodium chloride is decanted off and a further leaching carried out to ensure that all traces of soluble products are removed. The remaining titanium is then washed and dried.

The following example illustrates but does not limit the invention:

*Example*

Molten sodium was reacted with 0.8% excess titanium tetrachloride at approximately 850° C. in an atmosphere of argon. When the reaction was complete the products were cooled in the same inert atmosphere and then crushed and ground to powder. A portion of the powder was leached with an aqueous solution containing 2% hydrochloric acid and 1% sodium phosphite. After stirring for 30 minutes at room temperature the aqueous solution containing dissolved sodium chloride was decanted off and a further leaching carried out to ensure that all traces of soluble products were removed. The hydrogen content of the metal so prepared was found to be 0.003%.

Another portion of the titanium powder obtained as above described was leached with an aqueous solution containing 2% hydrochloric acid but without the presence of sodium phosphite. The titanium metal so prepared was found to contain 0.005% hydrogen.

What we claim is:

1. In a process for the manufacture of titanium by the reaction of titanium tetrachloride with metallic sodium in an inert atmosphere and isolating titanium from the reaction product by leaching in an aqueous solution, the improvement whereby titanium of low hydrogen content is obtained which comprises carrying out the said reaction in the presence of lower chlorides of titanium and leaching the reaction product containing said lower chlorides of titanium with an aqueous solution of a mineral acid containing a soluble phosphite.

2. An improved process according to claim 1 in which leaching of the aforesaid product is carried out with an aqueous solution of a mineral acid containing an alkali metal phosphite.

3. An improved process according to claim 1 in which leaching is carried out with an aqueous solution of a mineral acid containing less than 10% by weight of sodium phosphite.

4. An improved process according to claim 1 in which leaching is carried out with an aqueous solution of a mineral acid containing between 0.5% and 2% by weight of sodium phosphite.

5. An improved process according to claim 1 in which the presence of the aforesaid lower chlorides of titanium is conditioned by carrying out the reaction between titanium tetrachloride and sodium using an excess of titanium tetrachloride amounting to more than 0.25% by weight of the stoichiometric quantity.

6. The process of claim 5 wherein the excess titanium tetrachloride is between 0.5% and 3.0% by weight of the stoichiometric quantity.

7. In a process for the manufacture of titanium by the reaction of titanium tetrachloride with metallic sodium in an inert atmosphere and isolating titanium from the reaction product by leaching in an aqueous solution, the improvement whereby titanium of low hydrogen content is obtained which comprises reacting said titanium tetrachloride and metallic sodium to obtain a reaction product containing a lower chloride of titanium and leaching the product containing said lower chloride with an aqueous solution of a mineral acid containing a soluble phosphite.

References Cited in the file of this patent

FOREIGN PATENTS 726,367    Great Britain _____ Mar. 16, 1955